(12) United States Patent
Risbourg et al.

(10) Patent No.: US 12,714,627 B2
(45) Date of Patent: Aug. 25, 2026

(54) METHOD FOR MOVING AN EXOSKELETON

(71) Applicant: WANDERCRAFT, Paris (FR)

(72) Inventors: Fanny Risbourg, Paris (FR); Gabriele Buondonno, Paris (FR); Roch Molléro, Paris (FR); Stanislas Brossette, Paris (FR); Guilhem Boéris, Paris (FR)

(73) Assignee: WANDERCRAFT, Paris (FR)

( * ) Notice: Subject to any disclaimer, the term of this patent is extended or adjusted under 35 U.S.C. 154(b) by 664 days.

(21) Appl. No.: 18/039,079

(22) PCT Filed: Dec. 15, 2021

(86) PCT No.: PCT/FR2021/052335

§ 371 (c)(1), (2) Date: May 26, 2023

(87) PCT Pub. No.: WO2022/129784

PCT Pub. Date: Jun. 23, 2022

(65) Prior Publication Data

US 2024/0000648 A1 Jan. 4, 2024

(30) Foreign Application Priority Data

Dec. 16, 2020 (FR) ....................................... 2013340

(51) Int. Cl.

| | |
|---|---|
| ***A61H 3/00*** | (2006.01) |
| ***B25J 9/00*** | (2006.01) |
| ***B25J 9/16*** | (2006.01) |

(52) U.S. Cl.

CPC .............. *A61H 3/00* (2013.01); *B25J 9/0006* (2013.01); *B25J 9/1615* (2013.01);

(Continued)

(58) Field of Classification Search

CPC . B25J 9/0006; A61H 3/00; A61H 1/00; A61H 1/02; A61H 1/0237; A61H 1/0255; A61H 1/0262

See application file for complete search history.

(56) References Cited

U.S. PATENT DOCUMENTS

| | | | |
|---|---|---|---|
| 2013/0226048 A1* | 8/2013 | Unluhisarcikli ..... | A61H 1/0244 601/34 |
| 2020/0206898 A1 | 7/2020 | Xiong | |
| 2022/0347847 A1 | 11/2022 | Duburcq et al. | |

FOREIGN PATENT DOCUMENTS

| | | |
|---|---|---|
| CN | 105538313 A | 5/2016 |
| EP | 2497610 A1 | 9/2012 |

(Continued)

OTHER PUBLICATIONS

Caron Stephane, et al., "Stair Climbing Stabilization of the HRP-4 Humanoid Robot Using Whole-Body Admittance Control", 2019 International Conference on Robotics and Automation (ICRA), IEEE, May 20, 2019, pp. 277-283, XP033594324.

(Continued)

*Primary Examiner* — Joseph D. Boecker
*Assistant Examiner* — Jaeick Jang
(74) *Attorney, Agent, or Firm* — Thomas | Horstemeyer, LLP

(57) ABSTRACT

The present invention relates to a method for moving a bipedal exoskeleton, the method comprising obtaining a theoretical elementary trajectory of the exoskeleton and executing a control loop defining the change in an actual position of the exoskeleton so as to implement an actual elementary trajectory close to said theoretical elementary trajectory. Executing the control loop comprises, in each iteration of the loop, estimating a current state of the exoskeleton as a function of said actual position, determining a wrench to be applied to the exoskeleton in the next (Continued)

(a) Generation of theoretical elementary trajectory (b) Execution of the control loop:
- Estimation of a current state
- Determination of a wrench to be applied to compensate for deviation between estimated current state and expected state
- Application of admittance controller iteration of the loop to compensate for a deviation between said estimated current state of the exoskeleton and an expected state of the exoskeleton according to said theoretical elementary trajectory, determining the wrench and/or applying it to the exoskeleton taking into account a model of the flexibility of the exoskeleton with respect to a rigid robot.

18 Claims, 4 Drawing Sheets

(52) U.S. Cl.
CPC ................ *A61H 2201/5012* (2013.01); *A61H 2201/5064* (2013.01); *A61H 2201/5071* (2013.01)

(56) References Cited

FOREIGN PATENT DOCUMENTS

| | | | |
|---|---|---|---|
| FR | 3101463 | A1 | 4/2021 |
| WO | 2015/140352 | A1 | 9/2015 |
| WO | 2015/140353 | A2 | 9/2015 |

OTHER PUBLICATIONS

Li Zhijun, et al., Physical Human-Robotic Interaction of a Robotic Exoskeleton By Admittance Control, IEEE Transations on Industrial Electronics, IEEE Service Center, Piscataway, NJ, vol. 65, No. 12, Dec. 1, 2018, pp. 9614-9624, XP011687822.

Preliminary Search Report in related French Application No. 888924, mailed Sep. 9, 2021.

International Search Report in related PCT Application No. PCT/FR2021/052335, mailed Apr. 25, 2022.

Omar Harib, et al., "Feedback Control of an Exoskeleton for Paraplegics", ARxIV:1802.08322V2, May 21, 2018.

T. Gurriet et al., "Towards Restoring Locomotion for Paraplegics: Realizing Dynamically Stable Walking on Exoskeletons," 2018 IEEE International Conference on Robotics and Automation (ICRA), Brisbane, QLD, Australia, 2018, pp. 2804-2811, doi: 10.1109/ICRA.2018.8460647.

Chinese Office Action in related Chinese Application No. 2021180085261.6, mailed May 19, 2025.

* cited by examiner

METHOD FOR MOVING AN EXOSKELETON

CROSS REFERENCE TO RELATED APPLICATIONS

This application is the 35 U.S.C. § 371 national stage application of PCT Application No. PCT/FR2021/052335, filed Dec. 15, 2021, which application claims the benefit of French Application No. FR 2013340 filed Dec. 16, 2020.

GENERAL TECHNICAL FIELD

The present invention relates to the field of biped robots such as humanoid robots and exoskeletons.

More specifically, it relates to a method for setting in motion an exoskeleton with an admittance controller.

STATE OF THE ART

Recently, assisted walking devices called exoskeletons have appeared for people with major mobility problems, such as paraplegics, these devices are external robotic devices that the operator (the human user) "puts on" thanks to an attachment system that binds the motions of the exoskeleton to his own motions. The lower limb exoskeletons have multiple joints, usually at least at the level of the knees and hips, to reproduce the walking motion. Actuators make it possible to move these joints, which in turn make the operator move. An interface system allows the operator to give orders to the exoskeleton, and a control system transforms these orders into command for the actuators. Sensors generally complete the device.

These exoskeletons constitute an advance compared to wheelchairs because they allow the operators to stand up and walk. The exoskeletons are no longer limited by the wheels and can theoretically evolve in most of non-flat environments: the wheels, unlike the legs, do not allow overcoming significant obstacles such as steps, stairs, very high obstacles, etc. The known exoskeleton control methods make it possible to perform stable and autonomous walking on "even" that is to say planar ground (improperly referred to as flat ground, but it is meant ground without uneveness, for example indoors or on a treadmill) and to withstand minor external disturbances. Mention can be made for example to documents *Towards Restoring Locomotion for Paraplegics: Realizing Dynamically Stable Walking on Exoskeletons*, T. Gurriet et al., or *Feedback Control of an Exoskeleton for Paraplegics: Toward Robustly Stable, Hands-Free Dynamic Walking*, O. Harib et al.

However, this does not make it possible either to withstand strong disturbances or to walk on non-flat ground as can be found in an urban environment with cobbled streets for example. In such circumstances, the exoskeleton could fall and injure the user.

To be able to move in such environments, it is necessary to use active control methods making it possible to react to disturbances in order to maintain the balance of the exoskeleton while continuing the walking, but until then nothing satisfactory was proposed and it is still necessary to use a gantry for holding the exoskeleton in case it falls.

It would be desirable to have a new solution for setting in motion any exoskeleton, that reliably and ergonomically allows its walking on any terrain, including uneven terrain.

PRESENTATION OF THE INVENTION

The present invention thus relates, according to a first aspect, to a method for setting in motion a biped exoskeleton receiving a human operator, the method comprising the implementation, by data processing means of the exoskeleton, of steps of:

(a) obtaining a theoretical elementary trajectory of the exoskeleton:

(b) executing a control loop defining the evolution of an actual position of the exoskeleton so as to implement an actual elementary trajectory similar to said theoretical elementary trajectory, comprising at each iteration of the loop:

Estimation of a current state of the exoskeleton as a function of said actual position;

Determination of a wrench to be applied to the exoskeleton at the next iteration of the loop to compensate for a deviation between said estimated current state of the exoskeleton and an expected state of the exoskeleton in accordance with said theoretical elementary trajectory;

the determination of the wrench and/or its application to the exoskeleton taking into account a flexibility model of the exoskeleton compared to a rigid robot.

ACCORDING TO ADVANTAGEOUS AND NON-LIMITING CHARACTERISTICS

The method comprises the repetition of the steps (a) and (b) so as to make the exoskeleton walk through a succession of actual elementary trajectories each corresponding to a step.

The theoretical elementary trajectory obtained in step (a) starts from an initial position, step (b) comprising the determination of a final position of the exoskeleton at the end of said actual elementary trajectory, said final position being used as the initial position on the next occurrence of step (a).

Step (b) comprises, at the beginning of each iteration of the loop, the application to the exoskeleton of said wrench determined at the prior iteration by means of an admittance controller.

The determination of a wrench to be applied to the exoskeleton to compensate for the deviation between said estimated current state of the exoskeleton and an expected state of the exoskeleton in accordance with said theoretical elementary trajectory comprises the implementation of a feedback control on at least one parameter defining the state of the exoskeleton.

The position of the exoskeleton is defined by a vector of the joint positions of the actuated degrees of freedom of the exoskeleton, the state of the exoskeleton being defined by at least one parameter chosen from among the positions, velocities and accelerations of the actuated degrees, the positions and velocities of a Center of Mass CoM, of a divergent component of motion DCM, the position of a Center of Pressure CoP, and the position of a Zero Moment Point ZMP; particularly defined by the positions of the Center of Mass CoM, of the divergent component of motion DCM and of the Center of Pressure CoP.

Said feedback control is implemented on the position of the DCM.

Said wrench to be applied to the exoskeleton 1 is defined by a position of the CoP.

Said wrench to be applied to the exoskeleton 1 is determined by adding to the expected position of the CoP in accordance with said theoretical elementary trajectory at least one term on the error between the estimated and expected current positions of the CoP, and one term on the error between the estimated and expected current positions of the DCM, particularly in accordance with the formula $$z = z_d - \left(1 + \frac{K_p}{\omega}\right)e_\xi - K_i \int e_\xi + \frac{K_d}{\omega}e_z,$$

where $z_d$ is the expected position of the CoP in accordance with said theoretical elementary trajectory, $e_\xi$ and $e_z$ are the errors between the estimated and expected current positions of the CoP and of the DCM respectively, and $K_p$, $K_i$ and $K_d$ are gains.

Said flexibility model defines a modification of the expected position of the CoP used to determine the wrench.

The exoskeleton has at least one flexible actuated degree of freedom, said flexibility model defining an offset to be applied to a position and/or a target velocity of said flexible actuated degree of freedom determined following the application of the wrench.

Said flexibility model defines at least one parameter of the state of the exoskeleton to be replaced by an average value observed on actual stable walking.

Said flexibility model is predetermined experimentally, from actual stable walking and/or simulations.

According to a second aspect, the invention relates to an exoskeleton comprising data processing means configured to implement a method, according to the first aspect, for setting in motion the exoskeleton.

According to a third aspect, the invention relates to a system comprising a server and the exoskeleton according to the second aspect, the server comprising data processing means configured to generate said theoretical elementary trajectory and provide it to the exoskeleton in step (a).

According to a fourth and a fifth aspect, the invention relates to a computer program product comprising code instructions for the execution of a method, according to the first aspect, for setting in motion an exoskeleton; and a storage means readable by a computer equipment on which a computer program product comprises code instructions for the execution of a method, according to the first aspect, for setting in motion an exoskeleton.

PRESENTATION OF THE FIGURES

Other characteristics and advantages of the present invention will appear upon reading the following description of one preferred embodiment.

This description will be given with reference to the appended drawings in which.

Figure 4:
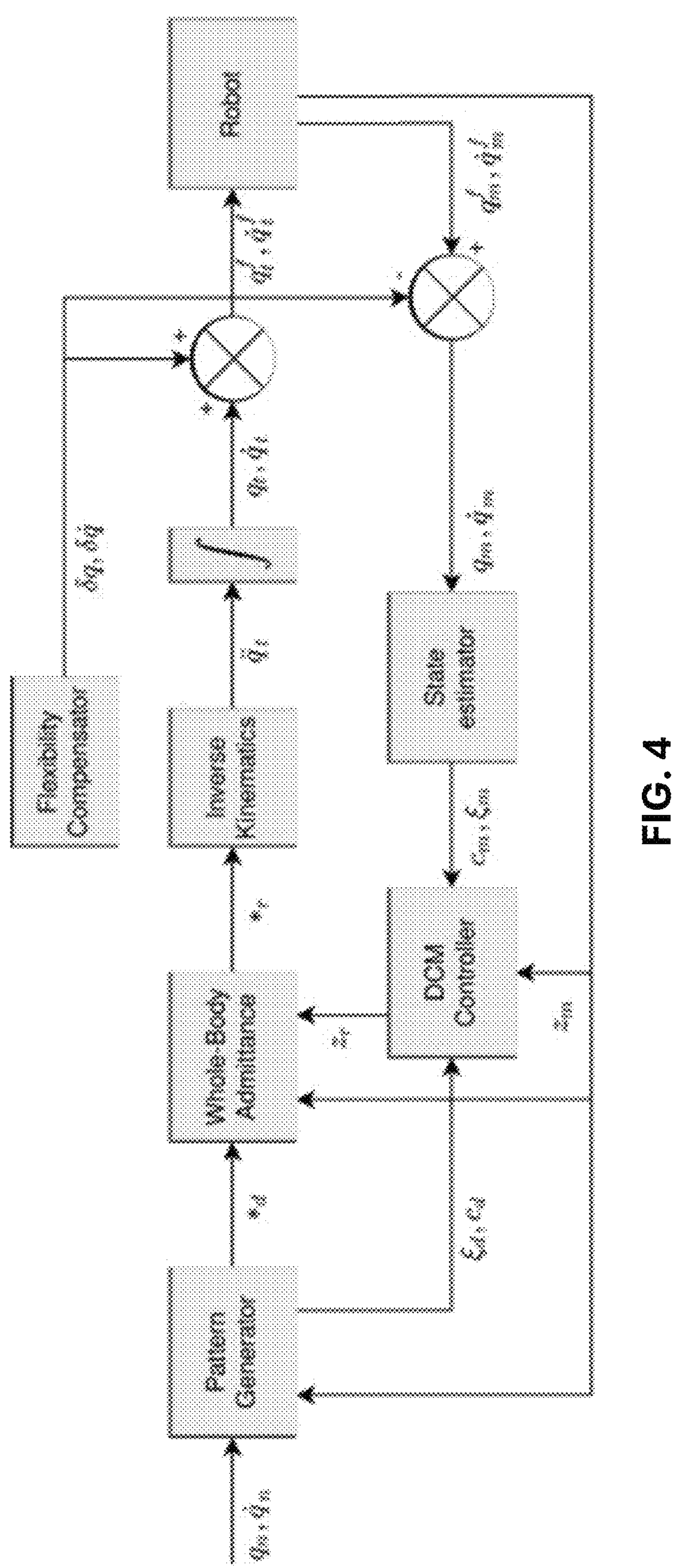

FIG. 4 schematically represents the control loop used in one preferred embodiment of the method according to the invention.

DETAILED DESCRIPTION

Architecture

The present invention proposes a method for setting in motion an exoskeleton 1.

Figure 1:
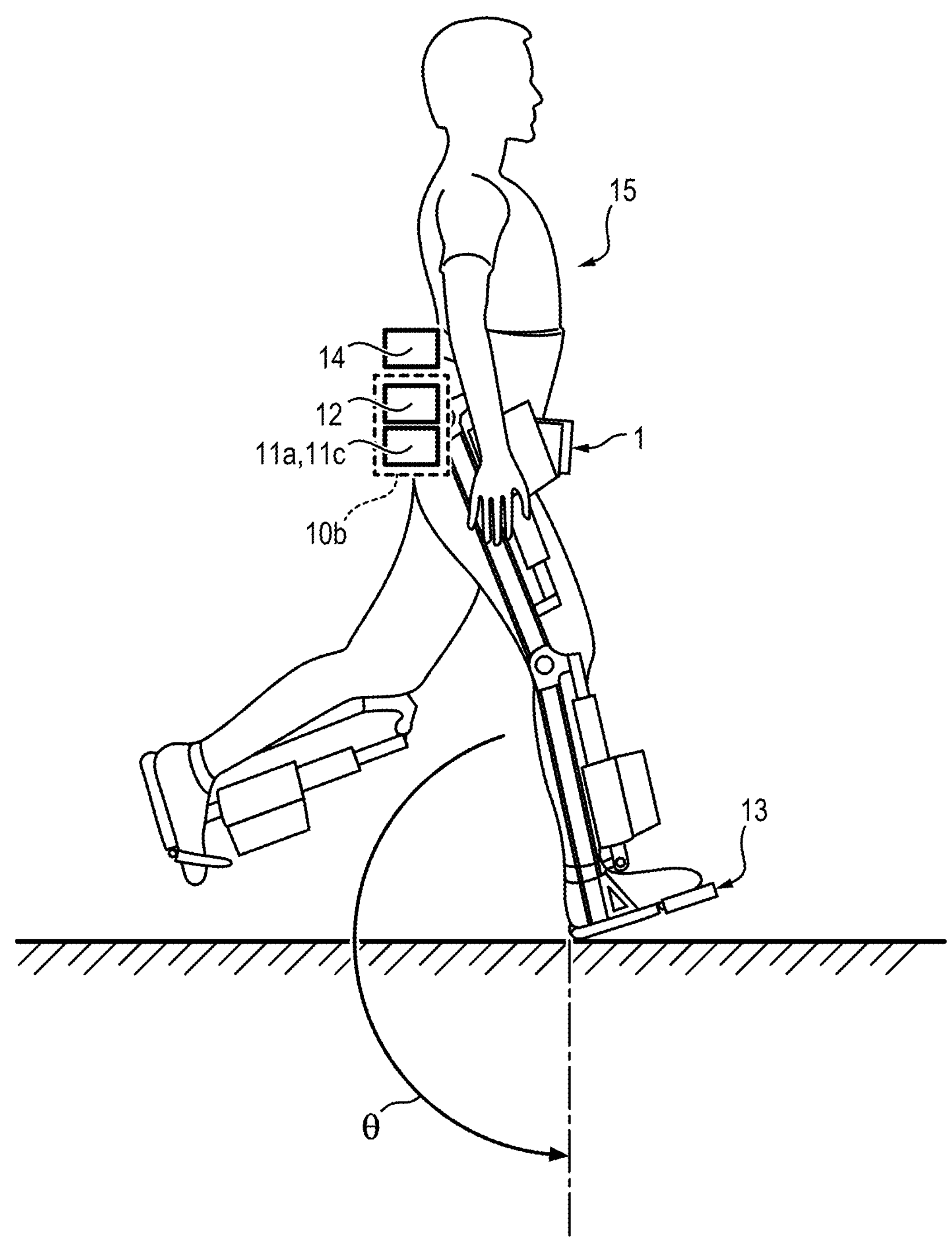
FIG. 1 is a diagram of an exoskeleton used by the methods according to the invention.

Referring to FIG. 1, said exoskeleton 1 is an articulated mechanical system of the actuated and controlled biped robotic device type, provided with two legs, more specifically accommodating a human operator whose lower limbs are each secured to a leg of the exoskeleton 1 (in particular thanks to straps). It can thus be a more or less humanoid robot. The "setting in motion" in practice means in alternating bearing on the legs, in a standing position, so as to produce a movement. It is most often a walking, particularly forwards, but it can be in practice any motion, including backwards, sideways, half-turn, sitting, standing, etc.

As will be seen later, it is assumed that a motion of the exoskeleton is composed of a sequence of elementary trajectories such as steps, each step consisting of a foot lifting off the ground then resting, before reversal of the roles (i.e., alternation of steps of the left foot and the right foot). By step it is meant any movement of a foot for any motion.

The exoskeleton 1 has a plurality of degrees of freedom, that is to say movable joints (generally via a rotation) relative to each other, which are each either "actuated" or "non-actuated".

An actuated degree of freedom designates a joint provided with an actuator controlled by data processing means 11*c*, that is to say this degree of freedom is controlled and may be acted upon. On the contrary, a non-actuated degree of freedom designates a joint without an actuator, that is to say this degree of freedom follows its own dynamics and the data processing means 11 have no direct control over it (but a priori an indirect control via the other actuated degrees of freedom).

The present exoskeleton naturally comprises at least two actuated degrees of freedom, preferably a plurality of them. As will be seen, some of these degrees of freedom can be "flexible".

The data processing means 11*c* designate a computer equipment (typically a processor, namely external if the exoskeleton 1 is "remotely controlled" but preferentially embedded in the exoskeleton 1, see below) adapted to process instructions and generate commands for the different actuators. These can be electric, hydraulic actuators, etc.

The present application will not be limited to any architecture of exoskeleton 1, and the example as described in the applications WO2015140352 and WO2015140353 will be considered.

Thus, preferably and in accordance with these applications, the exoskeleton 1 comprises on each leg a foot structure comprising a support plane on which a foot of a leg of the person wearing the exoskeleton can bear.

This support plane comprises for example a front platform and a rear platform, such that a foot pivot link connects the front platform to the rear platform, constituting a non-actuated degree of freedom.

Those skilled in the art will however be able to adapt the present method to any other mechanical architecture.

Figure 2:
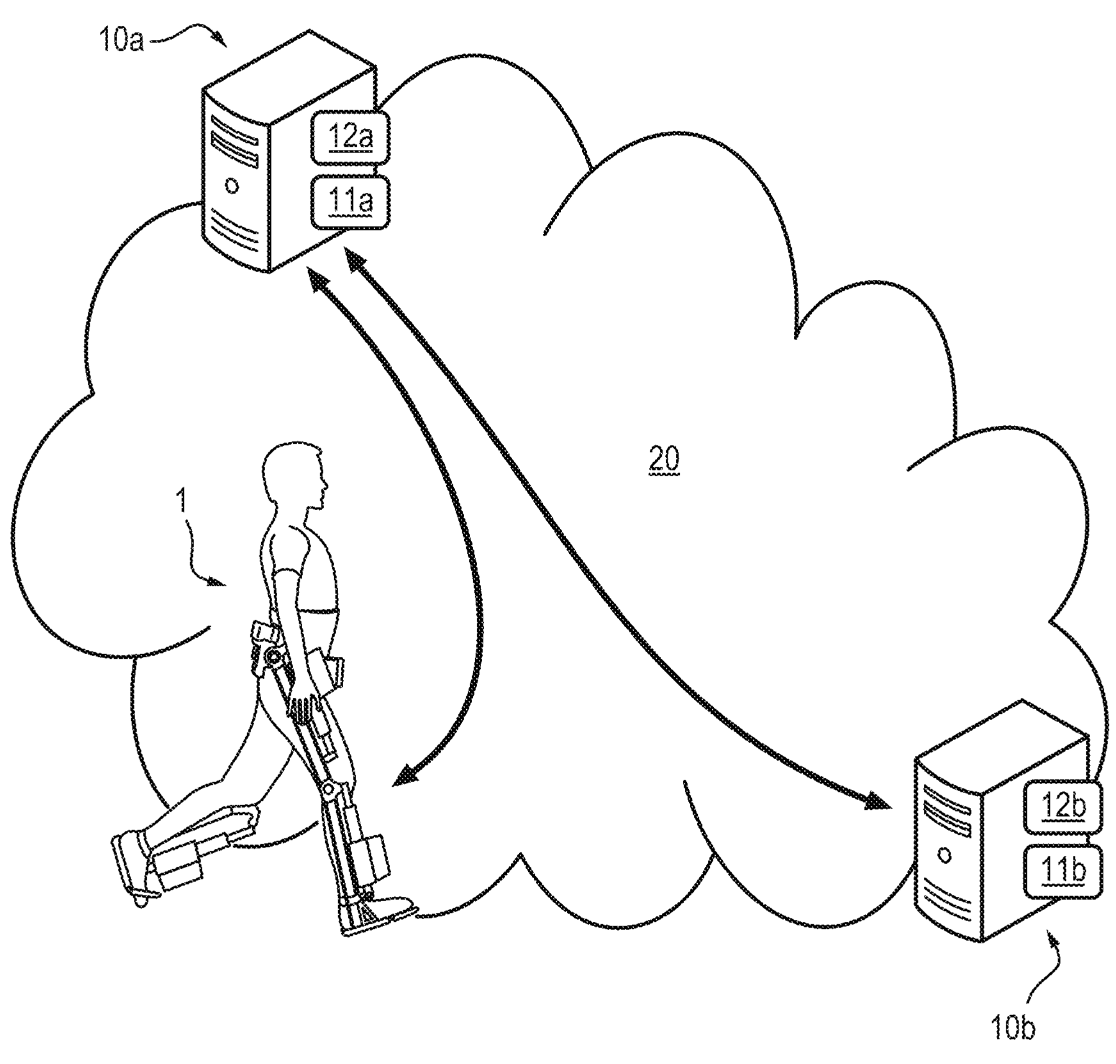
FIG. 2 is a diagram of an architecture for the implementation of the methods according to the invention.

According to one preferred embodiment, the present trajectory and walking generation method can involve a first or a second server 10*a*, 10*b* within an architecture as represented by FIG. 2.

The first server 10*a* is a trajectory generation server, and the second server 10*b* is a possible learning server.

Indeed, the generation of a trajectory of the exoskeleton 1 can use a neural network, particularly of the Feedforward Neural Network (FNN) type, as proposed in the application FR1910649. The second server 10*b* is then a server for the implementation of a method for learning parameters of said neural network. It should be noted that the present method is not limited to the use of a neural network, and it will be possible to use any known technique for generating the trajectory in its entirety, or even further.

In any case, it is quite possible that these two servers are combined, but in practice the second server 10*b* is most often a remote server whereas the first server 10*a* can be embedded by the exoskeleton 1 for real-time operation, as represented by FIG. 2. According to one preferred embodiment, the first server 10*a* implements the method for generating a trajectory of the exoskeleton 1 thanks to a neural network using the parameters retrieved from the second server 10*b*, and the exoskeleton 1 normally directly applies said trajectory generated in situ to start moving.

Each of these servers 10*a*, 10*b* is typically a computer equipment connected to a wide area network 20 such as the Internet network for the exchange of data, even if in practice once the neural network has been learned and embedded on the second server 10*b*, the communication can be interrupted, at least intermittently. Each comprises data processing means 11*a*, 11*b* of the processor type (particularly the data processing means 11*b* of the second server have a high computing power, because the learning is long and complex compared to the simple use of the learned neural network), and where appropriate data storage means 12*a*, 12*b* such as a computer memory, for example a hard disk. In the case of a trajectory generation by a neural network, a learning database can be stored by the memory 12*b* of the second server 10*b*.

It will be understood that there can be a plurality of exoskeletons 1 each embedding their first server 10*a* (which can then be of limited power and space requirement, insofar as it only generates trajectories for the exoskeleton 1 to which it is dedicated), or a plurality of exoskeletons 1 each connected to a more powerful first server 10*a* and possibly combined with the second server 10*b* (and having the ability to generate trajectories on the fly for all the exoskeletons 1).

Trajectory

As explained, by "trajectory" of the exoskeleton it is conventionally meant the evolutions of each degree of freedom (particularly actuated, but the non-actuated degrees can intervene in the algorithms for controlling the other degrees of freedom) expressed as a function of time or of a phase variable. In the remainder of the present description, by "position" of the exoskeleton 1 it is meant the joint positions of the actuated degrees of freedom, which are advantageously six in number per leg, namely a position defined by a vector of dimension 12, even if it would for example be possible to take the Cartesian position of a characteristic point of the exoskeleton, for example its Center of Mass (CoM—we then have a vector of dimension 3 corresponding to the 3 positions along the 3 axes).

Furthermore, it is known how to define a "complex" motion as a sequence of trajectories called "elementary" trajectories, where appropriate interspersed with transitions. By elementary trajectory it is most often meant a trajectory corresponding to a step, i.e., applied over the duration of the step so that starting from an initial state of the exoskeleton 1 at the beginning of a step (time of contact of the foot), we arrive at the beginning of the next step. It is noted that there is an alternation of left step and right step, and for example for a walking, it technically takes two steps to return exactly to the same state (same foot in front). Periodic trajectory refers to a stable succession of elementary trajectories allowing a walking, but as explained, the present method applies to any setting in motion.

This encompasses any flat walking, but also on ramp, a climb or a descent of stairs, a side step, a step turn, etc.

An elementary trajectory is associated with a given walking of the exoskeleton 1 (a walking being defined by an n-tuple of walking parameters), and makes it possible to maintain this walking in a stable and feasible way (i.e., as will be seen meets all the constraints of an optimization problem and minimizes a cost function as much as possible). As explained, said walking parameters correspond to "characteristics" of the way of walking, such as the length of the steps, the walking frequency and the inclination of the chest, but also the height of the steps when going up and going down stairs, the instantaneous angle of rotation for the curved movements; and also to morphological characteristics of the operator (a sub-group of the walking parameters called patient parameters) such as his height, his weight, the lengths of his thighs or of his shins, the position of center of mass (value of the shift forward) and the lateral displacement of the chest in the context of rehabilitation activity.

Said "constraints" of a walking mentioned above can be varied and depend on the desired type of walking, for example a "flat foot" walking or a walking with a "roll", etc. The present method will not be limited to any desired type of walking.

The possible transitions correspond to walking changes, i.e. variations in the values of said walking parameters (for example an increase in the step length): knowing an initial set of walking parameters and a final set of walking parameters, and therefore an initial periodic trajectory (associated with the initial set of walking parameters) and a final periodic trajectory (associated with the final set of walking parameters), said transition is a fragment of trajectory making it possible to switch from the initial periodic trajectory to the final trajectory. It should be noted that there must be "initial" or "final" transitions, corresponding to a start and an end of the motion.

Admittance Control

To be able to walk safely, including on uneven ground, the exoskeleton needs a "stabilizer", i.e., a dynamic controller applying the trajectory while ensuring the balance of the exoskeleton 1.

A method called "admittance control" method has proven effective in stabilizing the walking of humanoid robots, as illustrated for example in the document Stéphane Caron, Abderrahmane Kheddar and Olivier Tempier, *Stair Climbing Stabilization of the HRP-*4 *Humanoid Robot using Whole-body Admittance Control.*

The admittance control consists in estimating the state of the robot at any time, measuring its deviation from the reference trajectory, calculating a stabilizing wrench and applying this effort to the system via the control of the joint positions, in the form of a stabilization loop.

Particularly, said deviation from the reference trajectory is evaluated based on a quantity called Divergent-component of Motion (DCM) or capture-point, defined by the equation $\xi=c+\dot{c}/\omega$, where c is the position of the Center of Mass (CoM) et $\omega=\sqrt{g/h}$ the frequency of the Linear-Inverted Pendulum model (LIPM), with g the gravity constant and h the height of the CoM, which can be assumed to be constant.

This DCM makes it possible to decompose the second-order equation $\ddot{c}=\omega^2(c-z)$ of the LIPM (in which only the 2 horizontal components are considered), where z is the position of the ZMP, into two first-order coupled systems:

$$\dot{\xi} = \omega(\xi - z)$$

$$\dot{c} = \omega(\xi - c)$$

The first equation shows that the DCM naturally diverges from the ZMP (hence the name "divergent") while the second equation shows that the CoM converges towards the DCM.

A feedback control on the DCM (DCM control feedback) thus makes it possible to calculate said stabilizing wrench to be applied, and various admittance strategies called "whole-body admittance" strategies (document Stéphane Caron, Abderrahmane Kheddar and Olivier Tempier, *Stair Climbing Stabilization of the HRP-4 Humanoid Robot using Whole-body Admittance Control* gives the examples of the ankle admittance, the admittance of the CoM or the difference in force between the feet) make it possible to determine kinematic setpoints to be achieved so that the desired effort is applied (using inverse kinematics in general).

This possibility to improve the stability of the walking was likely to make the walking of the exoskeletons more stable on even ground and allow them to walk and move in environments with ground is uneven, but the application of the admittance control to the exoskeletons turned out to be disappointing.

Indeed, in its form, in its initial form as described by the document Stéphane Caron, Abderrahmane Kheddar and Olivier Tempier, *Stair Climbing Stabilization of the HRP-4 Humanoid Robot using Whole-body Admittance Control*, the admittance control method is not very robust. More specifically, the exoskeleton takes smaller steps than expected, drags its feet, even vibrates, and the gait is neither comfortable for the operator nor free of danger.

This is due to the fact that the exoskeleton 1 cannot be considered as a "rigid robot" in the same way as the HRP-4 in the aforementioned document, that is to say an articulated system whose dynamics can be sufficiently well described by the conventional equations of the rigid robotics.

This is called the "reality gap" of the exoskeletons, and it comes down to two main points:

- The operator in the exoskeleton 1 is himself a source of potentially significant disturbances;
- Parts of the exoskeleton are deformable (particularly ankle and/or hip), which results in particular in the fact that the foot in the air (called swing foot) is generally lower than expected and therefore touches the ground abnormally early.

The present method solves these difficulties very cleverly by proposing a modified admittance control taking into account a flexibility model of the exoskeleton 1 compared to a rigid robot, and the following tests were completed successfully:

- Autonomous walking of the exoskeleton 1 receiving a passive dummy and resistant to strong external disturbances (lateral thrusts, etc.);
- Autonomous walking of the exoskeleton 1 receiving a human operator on an uneven ground which constitutes a cobbled street with a curved profile;
- Autonomous walking of the exoskeleton 1 receiving a passive dummy on a treadmill for a long period (1,000 steps).

Method

Figure 3:
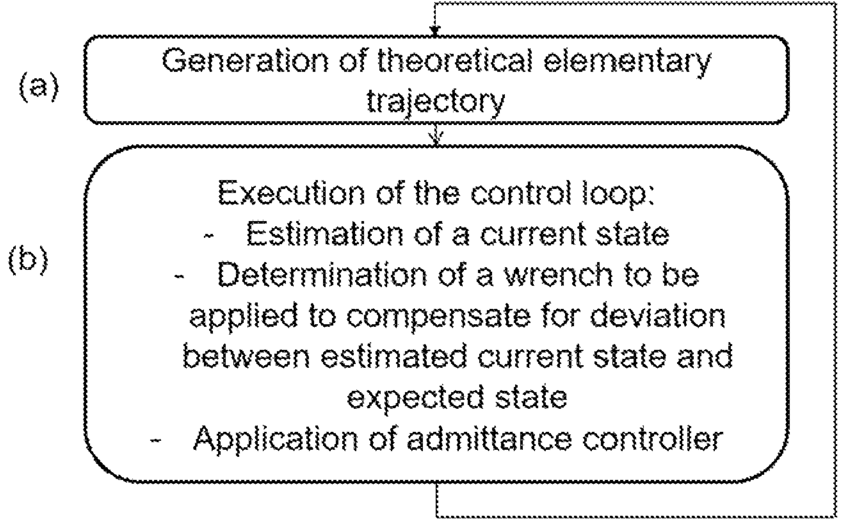
FIG. 3 is a diagram illustrating one preferred embodiment of the method according to the invention.

Referring to FIG. 3, said method for setting in motion the exoskeleton 1, implemented by the embedded data processing means 11*c*, begins with a step (a) of obtaining a theoretical elementary trajectory of the exoskeleton, corresponding for example to a step. This step can comprise the prior acquisition of at least one n-tuple of walking parameters defining a given walking of the exoskeleton 1, or a sequence of n-tuples of gradually changed walking parameters (for example due to new commands from the operator of the exoskeleton, in particular if the nature of the ground changes).

It should be noted that the acquisition can, as explained, directly involve the generation of the trajectory by the exoskeleton 1 (if for example it embeds the server 10*a*) or the simple receipt of the trajectory by the network 20. As such, the means 11*c* can provide the external server 10*a* with the walking parameters, and retrieve the trajectory in return.

The operator can be provided, as explained, with a vest of sensors 15 making it possible to detect the configuration of his chest (the orientation of the latter). The direction in which the operator orients his chest is the direction in which he wishes to walk and the velocity can be given by the intensity with which he puts his chest forward (how much he leans). The start request can correspond to when the operator presses a button (or a particular posture) indicating his intention to start up and therefore ordering the data processing means to determine said parameters. Some parameters such as the instantaneous angle of rotation or the height of the steps when going up or going down stairs can be predetermined or obtained by means of other sensors 13, 14.

For the generation of the trajectory strictly speaking, there will be no limitation to any known technique. As explained, optimization tools, capable in particular of generating a given trajectory according to the constraints and to the selected walking parameters, are known in particular. For example, in the case of HZD trajectories, the trajectory generation problem is formulated as an optimal control problem which can be solved preferably by an algorithm called direct collocation algorithm, see the document Omar Harib et al., *Feedback Control of an Exoskeleton for Paraplegics Toward Robustly Stable Hands-free Dynamic Walking*.

A neural network trained on a database of learning trajectories can also be used alternatively as explained.

In all cases, it will be assumed that an initial position of the exoskeleton 1 corresponding to its position at the beginning of the step has been defined.

The elementary trajectory generated is called "theoretical" trajectory, as opposed to an "actual" trajectory. Indeed, in a world free of any disturbance, it will be simply possible to apply the theoretical trajectory and the exoskeleton would walk automatically in accordance with this trajectory.

Here, it is assumed that disturbances are possible, due to the uneven nature of the ground as well as to the behavior of the operator or to external actions, so that the trajectory which is in practice performed by the exoskeleton 1 (the actual trajectory) never corresponds exactly to the planned theoretical trajectory, even if, as will be seen, the present method makes that they will remain close.

Then, in a main step (b), the method comprises the execution of a control loop defining the evolution of an actual position of the exoskeleton 1 so as to implement said actual elementary trajectory in the vicinity of said theoretical elementary trajectory, i.e., so that the exoskeleton 1 walks.

As explained, it is an admittance control, taking the form of an iterated loop, therefore one particularly preferred embodiment is represented in FIG. 4.

The execution of the admittance control loop comprises in a known manner at each iteration of the loop:

- the estimation (by a state estimator) of a current state of the exoskeleton 1 as a function of said actual position,
- the determination (typically by a controller of DCM) of a twister effort to be applied to the exoskeleton 1 at the next iteration of the loop to compensate for a deviation between said estimated current state of the exoskeleton 1 and a state expected from the exoskeleton 1 in accordance with said theoretical elementary trajectory;

and advantageously the application (by an admittance controller) to the exoskeleton 1 at the next iteration of the loop of said wrench determined via control of the joint positions;

but the determination of the wrench and/or its application to the exoskeleton 1 takes into account a model of flexibility of the exoskeleton 1 compared to a rigid robot.

By (current or expected) state of the exoskeleton 1 it is meant at least one parameter chosen from among the positions, velocities and accelerations of the actuated degrees, the position and velocity of the Center of Mass (CoM), of the divergent component of motion (DCM), the position of the Center of Pressure (CoP), the position of the Zero Moment Point (ZMP); particularly the three parameters which are the positions of the Center of Mass (CoM), of the divergent component of motion (DCM) and Center of Pressure (CoP). It is noted that in practice it is assumed that the CoP and the ZMP coincide (which is the case when the ground is substantially horizontal, even if uneven). Thus, in the rest of the present description, the notation z is used to designate one or the other, and we will speak for convenience of CoP. Insofar as we have an estimated current state and an expected state, we have for each parameter a current version and an expected version.

The current state is the "measurable" actual state of the exoskeleton 1 corresponding to the performed actual trajectory. In this case, each of its parameters is either directly measured (particularly positions of the actuated degrees and CoP), or estimated by the "state estimator" block in FIG. 4 from directly measured parameters (particularly CoM and DCM). The estimated positions of the CoM, of the DCM and of the CoP are respectively noted $c_m$, $\xi_m$, and $z_m$, as explained the DCM is in practice directly calculated from the CoM.

The expected state is the "desired" theoretical state that the exoskeleton 1 should assume if the theoretical trajectory were applied as it is, determined by the "pattern generator" block of FIG. 4. The expected positions of the CoM, of the DCM and of the CoP are respectively denoted $c_d$, $\xi_d$, and $z_d$.

In a particularly preferred manner, the current DCM $\xi_m$ is not estimated solely with the current CoM $c_m$, but with regard to the velocity of the CoM, with its target value, i.e., the one applied to the previous iteration $\dot{c}_r$. In other words, we do not have $\xi_m=c_m+\dot{c}_m/\omega$ but $\xi_m=c_m+\dot{c}_r/\omega$. Indeed, the target value is smoother while having the same average, and behaves like a filter improving the result.

Then, the determination of the wrench to be applied to the exoskeleton 1 at the next iteration of the loop to compensate for the deviation between said current and expected states of the exoskeleton 1 advantageously comprises the implementation of a feedback control (advantageously of the PID type) on at least one of said parameters defining the state of the exoskeleton, particularly the DCM, i.e., constitutes a controller of DCM (DCM control feedback block in FIG. 4).

Preferably, said wrench to be applied to the exoskeleton 1 is defined as a position of the Center of Pressure (CoP) and/or of the Zero Moment Point (ZMP). Again, it is assumed in practice that the COP and the ZMP coincide. It is understood that there are potentially three occurrences of the CoP: as a parameter of the estimated current state (called current CoP), as a parameter of the expected state (called expected CoP), and as a parameter defining said wrench to be applied (called reference CoP).

In one particularly preferred manner, said wrench to be applied to the exoskeleton 1 is determined using the formula:

$$z = z_d - \left(1 + \frac{K_p}{\omega}\right)e_\xi - K_i \int e_\xi + \frac{K_d}{\omega} e_z$$

Where $z_d$ is the expected position of the CoP in accordance with said theoretical elementary trajectory (calculated by the Pattern Generator block and provided directly to the admittance controller (the Whole-Body Admittance block) which will apply this effort), $e_\xi$ and $e_\xi$ are the errors between the estimated and expected currents CoP and DCM, and $K_p$, $K_i$ and $K_d$ are (adjustable) gains.

This formula proves to be very effective for the exoskeletons 1 receiving a human operator.

In practice, the controller of DCM (DCM feedback controller block) provides the last two terms of "compensation of the deviation" to the admittance controller (Whole-Body Admittance block), constituting the reference CoP denoted $z_r$ in FIG. 4.

Each iteration of the loop advantageously comprises, as explained, the application of said wrench to the exoskeleton 1 (at the beginning of the loop), by means of the admittance controller itself (the Whole-Body Admittance block), which generates particularly kinematic setpoints called reference kinematic setpoints (in contrast to the expected kinematic setpoints generated from the theoretical trajectory), which where appropriate can be converted into positions/velocities to be applied (called target positions/velocities) of the degrees actuated by using for example an inverse kinematics and an integration (if the inverse kinematics gives the accelerations). It should be noted that the possible inverse kinematics can comprise different hierarchical tasks (for example feet, CoM, pelvis then posture), according to the used admittance method.

The admittance controller indeed implements an ad-hoc method such as the ankle admittance (changing the ankle joint position to apply the force), the admittance of the CoM (requesting a movement of the center of mass), the difference in force between the feet (when in double support, raising or lowering the feet, by using force sensors under the feet), or any other position setpoint change strategy to control the forces.

For example, the CoM strategy consists in calculating the open-loop inverse kinematics $$\ddot{c} = \ddot{c}_d + A_c(z_m - z) = \ddot{c}_d + A_c\left(z_m - z_d + \left(1 + \frac{K_p}{\omega}\right)e_\xi + K_i \int e_\xi - \frac{K_d}{\omega} e_z\right),$$

where $z_m$ is the estimated current CoP (i.e. that of the current state, potentially measured directly) and $A_c$ is the gain of the admittance control.

In general, those skilled in the art will be able to consult the document Stéphane Caron, Abderrahmane Kheddar and Olivier Tempier, *Stair Climbing Stabilization of the HRP-4 Humanoid Robot using Whole-body Admittance Control* to implement this control loop.

Flexibility Compensation

As explained, the determination of the wrench and/or its application to the exoskeleton 1 takes into account a model of flexibility of the exoskeleton 1 relative to a rigid robot, that is to say here a conventional biped robot that does not receive a human operator, and can thus be considered as an isolated system. The opposition between rigid robotics and flexible (or "soft") robotics is well known to those skilled in the art and these terms have well-defined meaning.

The idea is to consider the exoskeleton 1 as "flexible", to model it by means of a model, and to apply this model either during the determination of the wrench to be applied to the exoskeleton, or during said application of the wrench to the exoskeleton. This is an open-loop correction (feed-forward), the values of the parameters (joint setpoints) are just modified, that is to say corrected (their initial value is taken into account) or directly replaced.

It should be noted that a retroactive control of the position of the feet was attempted to take into account the flexibilities, but this proved to be counterproductive and, despite the precision of the observer, this created more instability than anything else. The fact of directly applying the feed-forward model before or after the admittance control solves all the difficulties.

Several possible strategies for applying the model of flexibilities will now be discussed, they can be implemented separately or in combination. More specifically, the model of flexibilities can have several impacts in the control loop.

1—Applications of offsets on the target positions/velocities (i.e., those generated by the inverse kinematics) of at least one actuated degree called flexible degree (because subject to flexibility), particularly ankle and/or hip, as represented in FIG. 4.

As can be seen, a "Flexibility compensator" module generates the offsets and adds them to the target values to correct them before they are sent to the actuators.

Said model which makes it possible to determine the offsets is advantageously predetermined experimentally, from actual stable walking and/or simulations (for example thanks to the Jiminy simulator). For example, first there is the simulation of stable walking, then the model on actual steps on which the stability is proven is refined.

Particularly, said flexibility model models for example a flexible actuated degree like a spring, whose stiffness has been determined experimentally.

The advantage of this method is that it is transparent for the controller itself (since it is applied at the output of the admittance control).

It should be noted that this method also may (or may not) comprise, as represented in FIG. 4, the removal of the offsets from the positions measured to cancel the compensation of the flexibilities.

2—Modification of the CoP

In this strategy, said flexibility model is applied so as to modify the expected position of the CoP $z_d$, used by both the controller of DCM and the admittance controller.

Indeed, it was found that the CoP does not need to be totally dynamically consistent with the other parameters including the CoM.

It is possible to proceed in many ways, by filtering the expected CoP according to what is observed on actual steps, or even by directly taking the average expected COP (in position, velocity or acceleration) observed on actual steps, see method 3 just After. The flexibility model is then a "flexible" behavior model of the CoP.

Particularly, flexibility compensation can be performed during the change of the contact foot (see later), particularly if the contact foot is changed earlier than expected due to unexpected contact with the ground (typical consequence of the flexibilities). For greater stability and speed of calculation, a modified CoP can be calculated independently of the joint positions.

For example, the flexibility model can take the form of a first-order filter that can be applied to the expected CoP. When the contact foot is changed, the filter will naturally vary the expected CoP between the final value of the first step and the initial value of the second step, instead of changing abruptly.

Similarly, an MPC (Model Preview Control) strategy can be employed for the same purpose. This has the advantage of allowing the explicit inclusion of constraints in the modified CoP.

Alternatively, any other live re-planning strategy that allows for a smooth transition from one foot to the other would be feasible.

3—Replacement by an Average Value

In this approach, instead of physically modeling the flexibilities, their impact during the walking is modeled, on all or part of the parameters of the state of the exoskeleton 1, potentially including the CoM, the DCM or even the CoP.

Said flexibility model thus defines at least one parameter of the state of the exoskeleton to be replaced by an average value observed on actual stable walking, this replacement preferably being directly at the output of the admittance controller, before inverse kinematics.

The idea is to directly use values from steps whose stability has already been observed despite the flexibilities. Indeed, as a stabilization algorithm, the admittance controller loop can create a "stability area" around an already stable (proven) walking, which allows a better overall stability than when the work of stabilization of an unstable basic walking must also be performed.

Chain of Steps

Steps (a) and (b) can be repeated so as to make the exoskeleton 1 walk through a succession of actual elementary trajectories each corresponding to a step.

It must be kept in mind that the actual trajectory is different from the theoretical trajectory, so that the following trajectory must be adapted to the step that has just taken place, a fortiori due to the flexibilities that generally cause an impact of the foot earlier than expected.

Thus, the theoretical elementary trajectory obtained in step (a) starts from an initial position, step (c) advantageously comprising the determination of a final position of the exoskeleton 1 at the end of said actual elementary trajectory, said final position being used as the initial position at the next occurrence of step (a).

As explained, a complete periodic trajectory is generally generated (made up of a series of elementary trajectories), so that the new occurrence of step (a) consists in modifying the periodic trajectory (for the next elementary trajectory).

In other words, there is therefore an interpolation between the position of the exoskeleton 1 at the time of impact and the next step, in order to avoid a jump in the setpoints. The interpolation is performed at the time of impact, and modifies the beginning of the trajectory of the next step.

Equipment and System

According to a second aspect, the invention relates to the exoskeleton 1, for the implementation of the method according to the first aspect, and according to a third aspect, the system comprising the exoskeleton as well as a possible server **10*a***, possibly combined.

The exoskeleton 1 comprises data processing means **11*c* configured for the implementation of the method according to the second aspect, as well as, if necessary, data storage means 12 (particularly those of the first server 10*a*), inertial measurement means 14 (inertial unit), means for detecting the impact of the feet on the ground 13 and where appropriate estimating the contact forces (contact sensors or possibly pressure sensors), and/or a vest of sensors 15**.

It has a plurality of degrees of freedom including at least one degree of freedom actuated by an actuator controlled by the data processing means 11$c$ for the execution of said controller.

The first server 10$a$ comprises data processing means 11$a$ for generating said theoretical elementary trajectory and providing it to the exoskeleton in step (a), particularly upon receipt of the initial position of the exoskeleton 1 at the beginning of the step and any walking parameters.

Computer Program Product

According to a third and a fourth aspect, the invention relates to a computer program product comprising code instructions for the execution (on the processing means 11$c$) of a method, according to the first aspect, for setting in motion an exoskeleton 1, as well as storage means readable by a computer equipment on which there is this computer program product.

The invention claimed is:

1. A method for setting in motion a biped exoskeleton receiving a human operator, the method comprising the implementation, by a data processor of the exoskeleton, of steps of:

(a) obtaining a theoretical elementary trajectory of the exoskeleton;

(b) executing a control loop defining an evolution of an actual position of the exoskeleton so as to implement an actual elementary trajectory similar to said theoretical elementary trajectory, comprising at each iteration of the control loop:

estimation of a current state of the exoskeleton as a function of said actual position;

determination of a wrench to be applied to the exoskeleton at a next iteration of the control loop to compensate for a deviation between said estimated current state of the exoskeleton and an expected state of the exoskeleton in accordance with said theoretical elementary trajectory;

the determination of the wrench and/or application of the wrench to the exoskeleton taking into account a flexibility model of the exoskeleton compared to a rigid robot.

2. The method of claim 1, comprising repeating steps (a) and (b) so as to make the exoskeleton walk through a succession of actual elementary trajectories each corresponding to a step.

3. The method of claim 2, wherein the theoretical elementary trajectory obtained in step (a) starts from an initial position, step (b) comprising determining a final position of the exoskeleton at an end of said actual elementary trajectory, said final position being used as the initial position on a next occurrence of step (a).

4. The method of claim 1, wherein step (b) comprises, at a beginning of each iteration of the control loop, applying to the wrench determined at a prior iteration by means of an admittance controller to the exoskeleton.

5. The method of claim 1, wherein the determination of the wrench to be applied to the exoskeleton to compensate for the deviation between said estimated current state of the exoskeleton and the expected state of the exoskeleton in accordance with said theoretical elementary trajectory comprises implementing a feedback control on at least one parameter defining, at least partly, each of the expected and estimated current states of the exoskeleton.

6. The method of claim 1, wherein the actual position of the exoskeleton is defined by a vector of joint positions of actuated degrees of freedom of the exoskeleton, the expected and estimated current states of the exoskeleton being each defined by at least one parameter chosen from among positions, velocities and accelerations of the actuated degrees of freedom, positions and velocities of a Center of Mass (CoM) and/or of a divergent component of motion (DCM), a position of a Center of Pressure (CoP), and a position of a Zero Moment Point (ZMP) of the exoskeleton.

7. The method of claim 6, wherein determining the wrench to be applied to the exoskeleton to compensate for the deviation between said estimated current state of the exoskeleton and the expected state of the exoskeleton in accordance with said theoretical elementary trajectory comprises implementing a feedback control on at least one parameter defining, at least partly, each of the expected and estimated current states of the exoskeleton, said feedback control is implemented on the position of the DCM.

8. The method of claim 6, wherein said wrench to be applied to the exoskeleton is defined by the position of the CoP.

9. The method of claim 8, wherein said wrench to be applied to the exoskeleton is determined by adding to an expected position of the CoP in accordance with said theoretical elementary trajectory, at least one term relative to an error between the expected position of the CoP and an estimated current position of the CoP, and one term relative to an error between an expected position of the DCM and an estimated current position of the DCM.

10. The method of claim 9, wherein said wrench to be applied to the exoskeleton is determined in accordance with the formula $$z = z_d - \left(1 + \frac{K_p}{\omega}\right)e_\xi - K_i \int e_\xi + \frac{K_d}{\omega} e_z,$$

where $z_d$ is the expected position of the CoP in accordance with said theoretical elementary trajectory, $e_\xi$ and $e_z$ are the errors between the estimated and expected current positions of the CoP and the DCM respectively, and $K_p$, $K_i$ and $K_d$ are gains.

11. The method of claim 6, wherein said flexibility model defines a modification of an expected position of the CoP used to determine the wrench.

12. The method of claim 6, wherein the expected and estimated current states of the exoskeleton are each defined by the positions of the CoM, the DCM and the CoP.

13. The method of claim 1, wherein the exoskeleton has at least one flexible actuated degree of freedom, said flexibility model defining an offset to be applied to a target position and/or a target velocity of said flexible actuated degree of freedom determined following the application of the wrench.

14. The method of claim 1, wherein the expected and estimated current states of the exoskeleton are each defined by at least one parameter, and said flexibility model defines said parameter or at least one of said parameters to be replaced by an average value observed on an actual stable walking.

15. The method of claim 1, wherein said flexibility model is predetermined experimentally, from an actual stable walking and/or simulations.

16. An exoskeleton comprising a data processor configured to implement the method of claim 1 for setting in motion the exoskeleton.

17. A system comprising a server and the exoskeleton of claim 16, the server comprising a second data processor configured to generate said theoretical elementary trajectory and provide it to the exoskeleton in step (a).

18. A non-transitory computer-readable medium storing code instructions for the execution of the method of claim 1 for setting in motion an exoskeleton, when said code instructions are executed on a computer.

* * * * *